Figure 1:
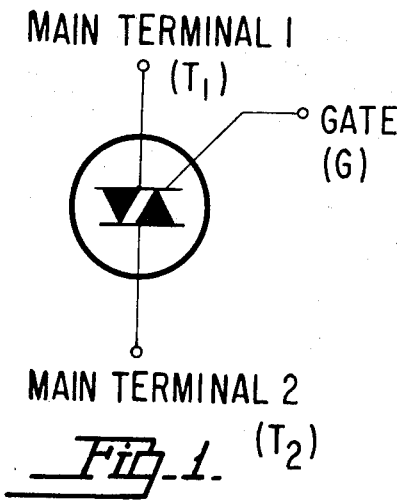

United States Patent [19]
Digneffe

[11] 3,742,337
[45] June 26, 1973

[54] PROTECTIVE SWITCHING CIRCUIT FOR PROVIDING POWER TO A LOAD FROM AN ALTERNATING CURRENT SOURCE HAVING PEAK-TO-PEAK EXCURSIONS WITHIN OR ABOVE A GIVEN RANGE

[75] Inventor: Henri Joseph Digneffe, Fexhe Slins, Belgium

[73] Assignee: RCA Corporation, New York, N.Y.

[22] Filed: Mar. 13, 1972

[21] Appl. No.: 234,188

[30] Foreign Application Priority Data
Great Britain.................. 43,261/71

[52] U.S. Cl.............. 323/19, 307/252 B, 318/345, 323/24, 323/39
[51] Int. Cl.............................................. G05f 5/00
[58] Field of Search................. 307/252 B; 318/345; 323/16, 19, 22 SC, 24, 34, 36, 39

[56] References Cited
UNITED STATES PATENTS

| | | | |
|---|---|---|---|
| 3,594,591 | 7/1971 | Laupman | 307/252 B |
| 3,353,078 | 11/1967 | Maynard | 323/36 UX |
| 3,450,891 | 6/1969 | Riley | 323/24 UX |
| 3,522,522 | 8/1970 | Tiemann | 323/36 X |

*Primary Examiner*—A. D. Pellinen
*Attorney*—Edward J. Norton and Herbert L. Jacobson

[57] ABSTRACT

First and second triggering circuits are provided within a switching circuit for supplying triggering signals to the gate of a thyristor as a function of an applied AC source. When the source exceeds a given predetermined magnitude, disabling means are effectuated which prevents a given one of the triggeing circuits from supplying a triggering signal. The switching circuit is designed so that the RMS voltage applied to a load is automatically regulated, independent of the magnitude of the applied AC source.

14 Claims, 3 Drawing Figures

3,742,337

SHEET 1 OF 2

PROTECTIVE SWITCHING CIRCUIT FOR PROVIDING POWER TO A LOAD FROM AN ALTERNATING CURRENT SOURCE HAVING PEAK-TO-PEAK EXCURSIONS WITHIN OR ABOVE A GIVEN RANGE

This invention relates to switching circuits and, more particularly, to thyristor switching circuits which do not require the intervention of the user to regulate the power applied to a load from voltage sources of alternative magnitudes.

In the design of many switching circuits, particularly those intended for use with small appliances, it is often desirable to provide a way to supply the load from a source of alternating current which may have one of two peak ratings. For example, many homes today are wired with both 110 volt and 220 volt outlets. Furthermore, it is not unusual for a traveller to find himself in an environment with a 220 volt system, for example, and an electrical appliance such as a razor which is nominally rated at 110 volts. In some instances the manufacturer of the appliance may, depending on the nature of the appliance, provide a voltage converter with the product. These converters are generally nothing more than a transformer having one or more manually switchable taps and, even if not provided with the appliance, are available commercially. Alternatively, electronic switching circuits are available which include manually adjustable compensating means, such as a rheostat, whereby the supply of RMS power to a load can be controlled over a range of input voltages (e.g., see U.S. Pat. No. 3,454,865). If the user is sophisticated enough to be aware of the problem, he will refrain from plugging in his razor, travel iron, toothbrush, etc., until first checking to see if a converter is necessary or the compensating means are properly adjusted. All too often, however, the user is not aware of the problem until after the damage has been done.

In accordance with the present invention, a switching circuit is provided for automatically controlling the power applied to a load from an alternating current source having a magnitude which may vary above and below a given level, said circuit comprising a thryristor having first and second main terminal electrodes and a gate electrode; a first triggering circuit for providing a triggering signal to the gate electrode of said thyristor when the magnitude of the alternating current source is below said given level; and a second triggering circuit for providing a triggering signal to said gate electrode when the magnitude of the alternating current source is above said given level.

In a typical embodiment of the present invention, a pair of time constant circuits are connected in circuit with the gate electrode of a thyristor. Means responsive to the magnitude of the applied AC, e.g., a Zener diode, are provided which serve to effectively disable the operation of a given one of the time constant circuits when the applied AC exceeds a predetermined value. For example, breakdown of the Zener diode may serve to bias a transistor which, when conducting, effectively grounds the output of said given circuit whereupon the remaining time constant circuit determines the point in time at which the thyristor will fire thereby ensuring a substantially constant supply of RMS power to the load being served.

Figure 2:
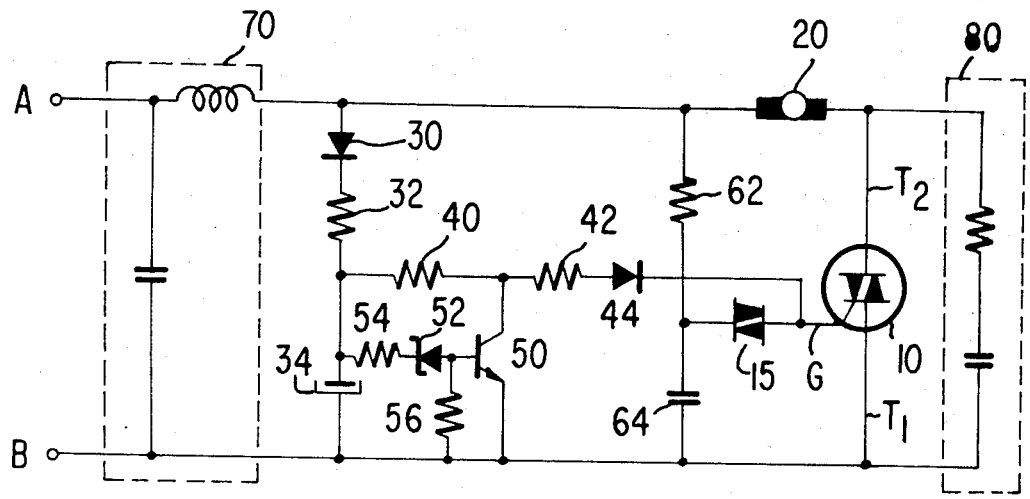
Figure 3:
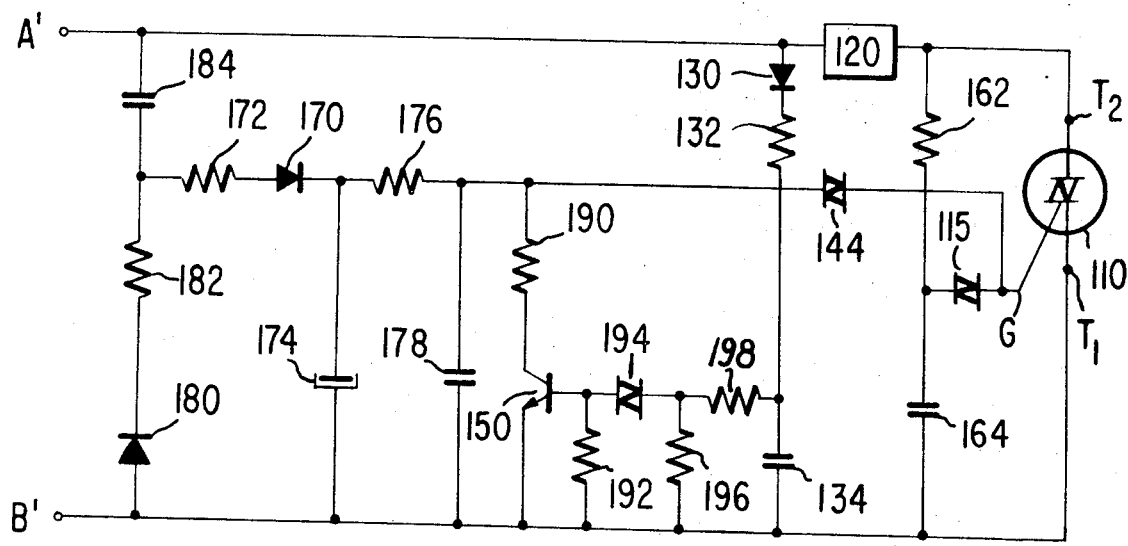

The present invention will be more fully understood by reference to the following detailed description in conjunction with the accompanying drawings wherein;

FIG. 1 is a schematic diagram of a particular type of thyristor, i.e. a triac, as used in this application; and FIGS. 2 and 3 are schematic diagrams of switching circuits in accordance with the present invention.

Referring first to FIG. 1, it will be seen that a triac is a three terminal solid state switch having a first main terminal electrode designated $T_1$, a second main terminal electrode designated $T_2$, and a gate electrode designated G. The triac is bidirectional in conduction, dependent upon the polarity of potential applied across its main terminal electrodes, and can be triggered into conduction in any of four operating modes as summarized below (all polarities taken with terminal $T_1$ as the point of reference potential):

| Operating Quadrant | $V_G$ | $V_{T_2}$ |
|---|---|---|
| I (+) | positive | positive |
| I (−) | negative | positive |
| III (+) | positive | negative |
| III (−) | negative | negative |

The gate-trigger requirements of the triac are different in each of the operating quadrants, generally being most sensitive in the I (+) and III (−) modes. When triggered into conduction the potential drop across the device is negligible and all of the electrodes (i.e., $T_1$, $T_2$ and G) operate at substantially the same potential. When the device is in a nonconducting or "off" state, terminal $T_1$ and gate electrode G will be at substantially the same potential and terminal $T_2$ will be at a different potential dependent upon the applied source of potential.

FIG. 2 is illustrative of a switching circuit in accordance with the present invention. The circuit shown in FIG. 2, and the description of operation to follow, is made with reference to the operation of a 110 volt universal motor from either a 110 volt or a 220 volt alternating current supply. It will be appreciated, however, that the circuit can readily be adapted to other supply voltages and can be used for other loads.

With reference to FIG. 2, the main terminal electrodes $T_1$, $T_2$ of a triac 10 are connected in series with a universal motor 20 and a pair of input terminals A, B adapted for connection to an alternating current source (not shown). A first time constant circuit having a charging path comprising a diode 30, a resistor 32 and an electrolytic capacitor 34 is connected in series in the order named across the input terminals A and B as shown; the diode 30 being poled to conduct conventional current from terminal A to terminal B. A second time constant circuit having a charging path comprising a resistor 62 and a capacitor 64 is similarly connected between terminals A and B. A discharge path comprising resistors 40 and 42, and diode 44 is connected in series in the order named between the junction formed by resistor 32 and capacitor 34 of the first time constant circuit and the gate electrode G of triac 10; diode 44 being poled to conduct conventional current toward the gate electrode G. A triggering diac 15 is similarly connected between the junction formed by resistor 62 and capacitor 64 of the second time constant circuit and the gate electrode G of triac 10. The collector of an NPN transistor 50 is connected to the junction formed between resistors 40 and 42, the emitter of transistor 50 being connected to input terminal B. The base of transistor 50 is connected to the anode of a Zener diode 52 having its cathode connected to a further resistor 54; the other end of resistor 54 being connected to the junction formed by resistor 32 and capacitor 34 of the first time constant circuit. A further resistor 56 is connected between the base and emitter electrodes of transistor 50. An RFI suppression filter 70 is provided for the purpose of minimizing high frequency interference. A conventional RC snubber network 80 is further provided across the main terminals $T_1$, $T_2$ of triac 10 to reduce the commutating dv/dt of the circuit to within the capability of the device. The use of the RFI suppression network 70 and the snubber network 80 will be familiar to those skilled in the art.

Turning now to a description of the operation of the circuit shown in FIG. 2, it will be seen that the series combination including diode 30, resistor 32 and capacitor 34 comprises a first time constant circuit which operates as a DC power supply. After the first few milliseconds of circuit operation, the gate electrode (G) of triac 10 is continuously provided with a DC current via resistors 40, 42 and diode 44 which functions as a discharge path for capacitor 34 and triggers the triac into conduction during consecutive half cycles. Due to the polarity of diodes 30 and 44 the triac is triggered into conduction in the I (+) and III (+) modes. Resistor 32 is selected so that a sufficient triggering signal is provided to the gate electrode (G) of triac 10 when the input voltage across terminals A and B is approximately 100 volts AC. Assuming the application of a 110 volt AC source across terminals A and B, transistor 50 is prevented from becoming conductive because the voltage drop across the Zener diode 52 is below its zener voltage thereby precluding the supply of base current.

Resistor 62 and capacitor 64 comprise a second time constant circuit which provides the gate of triac 10 with a triggering pulse via diac 15. In accordance with the example under discussion, i.e., the random possibility of either a 110 volt or 220 volt ac supply, resistor 62 is selected to provide a phase delayed triggering pulse to the gate of triac 10 via diac 15 so as to result in 110 volts RMS across the load 20 when the input voltage is a 220 volt alternating current source.

When the applied voltage across terminals A and B is below a given magnitude the triac is triggered into conduction via the DC current provided from the first time constant circuit comprising diode 30, resistor 32 and capacitor 34. When the applied potential exceeds said given magnitude, the Zener voltage of Zener diode 52 is exceeded causing it to break down and bias transistor 50 into saturation. In the circuit of FIG. 2, by way of example, resistor 54 can be selected so that the Zener diode 52 breaks down when the potential across terminals A and B exceeds 150 volts AC. With transistor 50 in saturation the current output from the DC power supply is shorted to terminal B and thereby rendered ineffective as a triggering signal for the triac 10. With the output from the DC power supply so shorted, triac 10 is triggered into conduction by the pulses supplied to the gate via triggering diac 15 from the second time constant circuit comprising resistor 62 and capacitor 64, resulting in an RMS voltage of 110 volts across the load 20, as discussed supra.

Although the triac 10 will be triggered into conduction by the DC current provided via diode 44 when the applied voltage across terminals A and B is below the "given magnitude," as discussed supra, the second time constant circuit comprising resistor 62 and capacitor 64 may, depending on the parameters of the circuit, nonetheless provide a triggering signal to the triac 10 via diac 15. Although this signal will be ineffectual (i.e., since the triac has already been triggered into conduction) its presence may introduce a gate dissipation problem. To obviate this problem resistor 62 may be connected on one end to the junction formed by capacitor 64 and diac 15, and on the other end to main terminal $T_2$ of triac 10, as shown in FIG. 3. In this manner, capacitor 64 is precluded from continuing to charge after the triac is triggered into conduction and the breakdown voltage of diac 15 is never attained so long as transistor 50 is not conducting.

The embodiment depicted in FIG. 2 was constructed using the following components:

| Element No. | Description |
| --- | --- |
| 10 | RCA 40525 triac |
| 15 | RCA 40583 diac |
| 30 | RCA 1N3194 diode |
| 32 | 8200 ohms |
| 34 | 25 microfarads, 100 volt |
| 40 | 5600 ohms |
| 42 | 1000 ohms |
| 44 | Phillips IN914 diode |
| 50 | Phillips BC147 |
| 52 | 33 volt Zener diode |
| 54 | 47,000 ohms |
| 56 | 10000 ohms |
| 64 | 0.1 microfarads, 200 volt |

The value of resistor 62 is dependent upon the characteristics of the load being served and is selected such that the desired RMS voltage appears across the load when transistor 50 is conducting, i.e., 110 volts RMS with an applied source of 220 volts AC.

Assuming 220 volt operation, in the circuit of FIG. 2 it will be seen that during the first few milliseconds of circuit operation, i.e., until the DC power supply comprising diode 30, resistor 32 and capacitor 34 attains steady-state operation, the charge on capacitor 34 will not be effective to break down Zener diode 52 although it will be effective to trigger triac 10 into conduction via diode 44. During these few milliseconds of operation the load 20 will see the full 220 volts which may, depending on the nature of the load, be unacceptable. FIG. 3 is illustrative of a circuit in accordance with the present invention which overcomes such a problem.

With reference to FIG. 3, the main terminal electrodes $T_1$, $T_2$ of a triac 110 are connected in series with the load 120 to be served and a pair of input terminals A', B' adapted for connection to an alternating current source (not shown). An RC circuit comprising a capacitor 184, a resistor 182 and a diode 180 is connected in series in the order named across the input terminals A' and B' as shown; diode 180 being poled to conduct conventional current from terminal B' to terminal A'. A second RC circuit comprising a resistor 172, a diode 170 and a capacitor 174 is connected in series in the order named between the junction formed by capacitor 184 and resistor 182, and terminal B'; diode 170 being poled to conduct conventional current toward terminal B'. It will be seen that the circuit including capacitor 184, resistors 182 and 172, and diodes 180 and 170 comprises a voltage doubler circuit which rectifies the line voltage applied across terminals A', B' and provides a DC output signal at the cathode of diode 170; capacitor 174 serving as a filter for said output signal. A third RC circuit comprising resistor 176 and capacitor 178 is connected in series in the order named between the cathode of diode 170 and terminal B'. A triggering diac 144 is connected on one end to the junction formed by resistor 176 and capacitor 178, and on the other end to the gate electrode G of the triac 110. Resistor 176, capacitor 178 and diac 144 form a free running oscillator which provides a pulse train to the gate electrode G at a frequency dependent upon the values of resistor 176 and capacitor 178. In the circuit of FIG. 3, the pulse train provided to the gate of the triac 110 has a frequency of approximately 2.5 KHz which frequency can be adjusted via resistor 176. Since the triac is now triggered by a pulse train rather than by a DC current, gate current is no longer a critical parameter in triac selection. It will be seen that the doubler circuit and the free running oscillator together comprise a first triggering circuit for providing a triggering signal to the gate electrode G of triac 110.

A further RC circuit comprising a diode 130, a resistor 132 and a capacitor 134 is connected in series in the order named across terminals A' and B'; diode 130 being poled to conduct conventional current toward terminal B'. A resistor 190 is connected in series with the collector of an NPN transistor 150; the free end of resistor 190 being connected to the junction formed by resistor 176 and capacitor 178; the emitter of transistor 150 being connected to terminal B'. The base of transistor 150 is connected to terminal B' through a resistor 192 and, in parallel therewith, through a series combination comprising a triggering diac 194 and a resistor 196, in the order named. A further resistor 198 is connected on one side to the junction formed by diac 194 and resistor 196, and on the other side to the junction formed by resistor 132 and capacitor 134. The series combination including diode 130, resistor 132 and capacitor 134 comprises a DC power supply having a very low time constant which rectifies the applied AC. The voltage available across capacitor 134 is used to break down diac 194 via resistor 198 when the line voltage applied across terminals A' and B' exceeds the predetermined level of magnitude, as in the case of the circuit of FIG. 2. However, because the charge on capacitor 134 is not used to provide a triggering signal to the gate electrode G of triac 110 (as in the case of capacitor 34 of FIG. 2), the time constant of the resistor 132-capacitor 134 combination can be made low enough so that diac 194 conducts as soon as the applied AC exceeds the predetermined magnitude, i.e., even during the first few milliseconds of current operation, thereby causing transistor 150 to immediately become conductive. With transistor 150 in a state of conduction the charge across capacitor 178 is sufficiently reduced to prevent the free running oscillator described above from operating, thereby, terminating the supply of a pulse train to the gate electrode via diac 144.

The second triggering circuit comprising a resistor 162 and a condenser 164 is connected across the main terminal electrodes $T_1$, $T_2$ of triac 110. A triggering diac 115 is connected between the gate electrode G of triac 110 and the junction formed by resistor 162 and capacitor 164. Resistor 162 and capacitor 164 are selected such that a triggering pulse is provided to the gate electrode via diac 115 in the absence of a pulse train via diac 144 (i.e., whenever the applied AC exceeds the selected predetermined level of magnitude) such that a regulated RMS voltage is applied across the load 120.

The circuit of FIG. 3 has been found particularly useful for high current loads (i.e., in excess of 2.5 amperes) which cannot tolerate even momentary overvoltages. Moreover, since the applied AC is filtered via capacitor 184, the power dissipated in the resistive elements of the circuit is minimized. The familiar RFI suppression network and snubber circuits, already shown in FIG. 2, have been omitted in FIG. 3 for the sake of simplicity.

The embodiment depicted in FIG. 3 may be constructed using the following components and is suitable for supplying power to a high current lamp load (i.e., approximately 12 amperes):

| Element No. | Description |
| --- | --- |
| 110 | RCA 2N5572 triac |
| 115, 144, 194 | RCA 40583 diac |
| 130, 170, 180 | 1N3194 diode |
| 132, 192 | 10,000 ohms |
| 134 | 1 microfarad |
| 150 | Phillips BC147 |
| 172, 182 | 33 ohms |
| 174 | 5 microfarads |
| 176 | 4700 ohms |
| 178, 164 | 0.1 microfarads |
| 184 | 0.15 microfarads |
| 190 | 1200 ohms |
| 196 | 47,000 ohms |
| 198 | 220,000 ohms |

As in the case of FIG. 2, the value of resistor 162 is dependent upon the characteristics of the load being served and is selected such that the desired RMS voltage appears across the load when transistor 150 is conducting, i.e., 110 volts RMS with an applied source of 220 volts ac; triac selection is dependent upon load current, the RCA 2N5572 being capable of carrying in the order of 15 amperes.

I claim:

1. A protective switching circuit for limiting the supply of power to a load from an alternating current source having peak-to-peak excursions within or above a given range comprising:
   a thyristor having first and second main terminal electrodes and a gate electrode;
   a first triggering circuit connected in circuit with said thyristor electrodes for providing a triggering signal to the gate electrode of said thyristor in response to said alternating current source when said excursions are within said given range; and
   a second triggering circuit connected in circuit with said thyristor electrodes for providing a triggering signal to the gate electrode of said thyristor in response to said alternating current source when said excursions are above said given range.

2. A switching circuit comprising:
   a thyristor adapted for connection to an alternating current source having peak-to-peak excursions within or above a given range, said thyristor having first and second main terminal electrodes and a gate electrode;
   means for connecting said main terminal electrodes in circuit with a load to be supplied from said alternating current source, the conduction state of said thyristor determining the supply of power to said load;
   a first time constant circuit for controlling the conduction state of said thyristor when the peak-to-peak excursions of said alternating current source are within said given range;
   means for charging said first time constant circuit from said alternating current source when said excursions are within said range;
   a second time constant circuit for controlling the conduction state of said thyristor when the peakto-peak excursions of said alternating current source are above said given range; and means for charging said second time constant circuit from said alternating current source when said excursions are above said range, said thyristor being triggered into conduction by a triggering signal applied to said gate electrode from said first time constant circuit when said excursions are within said range and via a triggering signal applied to said gate electrode from said second time constant circuit when said excursions are above said range.

3. A switching circuit as defined in claim 2 further comprising means for preventing said first time constant circuit from providing a triggering signal to said gate electrode when the peak-to-peak excursions of said alternating current source are above said given range.

4. A switching circuit as defined in claim 3 wherein said preventing means comprises a threshold device, said device becoming conductive when said excursions exceed said given range.

5. A protective switching circuit for limiting the power supplied to a load from an alternating current source having peak-to-peak excursions within or above a given range comprising:

a thyristor having first and second main terminal electrodes and a gate electrode;

means for connecting the main terminal electrodes of said thyristor in circuit with the load to be supplied, the conduction state of said thyristor determining the supply of power to said load;

first and second time constant circuits connected in circuit with said thyristor electrodes;

means for charging said first and second time constant circuit from said source;

means for effectively disabling said first time constant circuit when the peak-to-peak excursions of said source exceed said given range, said thyristor being triggered into conduction by a triggering signal applied to said gate electrode from said first time constant circuit when said excursions are within said range and via a triggering signal supplied to said gate electrode from said second time constant circuit when said excursions exceed said range.

6. A switching circuit comprising:

a triac having first and second main terminal electrodes and a gate electrode, said triac adapted for connection to an alternating current source having peak-to-peak excursions within or above a given range;

means for connecting said main terminal electrodes in circuit with a load to be supplied from said source, the conduction state of said triac determining the supply of power to said load;

a first time constant circuit having a charge path of a first time constant including an energy storage device and having a discharge path of a second time constant including said energy storage device;

means for charging said storage device over said time constant circuit charge path only when said alternating current source is of a given polarity;

means connected to the gate electrode of said triac for discharging said storage device over said time constant circuit discharge path and into said gate electrode;

means for preventing said energy storage means from discharging into said gate electrode when said peak-to-peak excursions exceed said given range;

a second time constant circuit including a further energy storage device;

means for charging said further energy storage device from said alternating current source; and means for discharging said further energy storage device into said gate electrode when said excursions exceed said given range;

whereby said triac is triggered into conduction by the first time constant circuit when said excursions are within said range and by the second time constant circuit when said excursions exceed said range.

7. A switching circuit as defined in claim 6 wherein said discharge prevention means includes a threshold device which becomes conductive when said excursions exceed said given range.

8. In a circuit which includes a load in circuit with the main terminal electrodes of a thyristor and which circuit is adapted to be operated by an alternating voltage source connected across said circuit, a circuit for limiting the power supplied to said load comprising:

first circuit means responsive to said alternating voltage when its peak-to-peak excursions are within a given range for providing a control signal to the gate electrode of said thyristor to cause power at an average level not greater than a given value related to the maximum voltage within said range to be applied to the load;

means responsive to said alternating voltage when its peak-to-peak excursions extend above said given range for effectively disconnecting said first circuit means from said thyristor; and second circuit means responsive to said alternating voltage when its peak-to-peak excursions extend beyond said given range for providing a control signal to said gate electrode so phased relative to said alternating voltage to cause power at an average level not greater than said given value to be delivered to the load.

9. The invention as defined in claim 8 wherein said first circuit means comprises a rectifier circuit for providing DC signals to the gate electrode of the thyristor.

10. The invention as defined in claim 8 wherein said first circuit means comprises an oscillator circuit for providing a train of pulses having a frequency greater than the frequency of the alternating current source to the gate electrode of the thyristor.

11. The invention as defined in claim 8 wherein said second circuit is a phase delay circuit.

12. The invention as defined in claim 11 wherein said phase delay circuit comprises a resistor-capacitor timing circuit and a threshold device responsive to the charge on said capacitor for providing said phased control signal to said gate electrode.

13. The invention as defined in claim 8 wherein said disconnecting means comprises a threshold circuit responsive to alternating voltage signals having peak-to-peak excursions beyond said given range.

14. The invention as defined in claim 13 wherein said threshold circuit comprises a threshold device connected in circuit with the base electrode of a transistor, said device becoming conductive to provide base current to said transistor when the peak-to-peak excursion of the alternating voltage signals exceeds said given range, said transistor thereby operating to effectively disable said first circuit means.

* * * * *